United States Patent [19]
Jackson

[11] 3,928,007
[45] Dec. 23, 1975

[54] DRY-TYPE AIR FILTERS
[75] Inventor: Neville Jackson, Hinckley, England
[73] Assignee: Burgess Products Company Limited, Hinckley, England
[22] Filed: Nov. 27, 1974
[21] Appl. No.: 527,700

Related U.S. Application Data
[63] Continuation of Ser. No. 334,130, Feb. 20, 1973, abandoned.

[30] Foreign Application Priority Data
Feb. 22, 1972 United Kingdom............... 8223/72

[52] U.S. Cl.................. 55/337; 55/392; 55/459 R
[51] Int. Cl.² ........................................ B01D 50/00
[58] Field of Search ............ 55/321, 325, 326, 337, 55/426, 432, 448, 462, 464, DIG. 28, 447, 55/459, 392

[56] References Cited
UNITED STATES PATENTS

| | | | |
|---|---|---|---|
| 3,048,959 | 8/1962 | Lowther | 55/DIG. 28 |
| 3,078,650 | 2/1963 | Anderson et al. | 55/DIG. 28 |
| 3,382,651 | 5/1968 | Hahl et al. | 55/337 |
| 3,429,108 | 2/1969 | Larson | 55/DIG. 28 |
| 3,672,130 | 6/1972 | Sollivan et al. | 55/337 X |
| 3,745,753 | 7/1973 | Risse | 55/DIG. 28 |

Primary Examiner—Bernard Nozick
Assistant Examiner—David L. Lacey
Attorney, Agent, or Firm—Ralph W. Kalish

[57] ABSTRACT

A dry-type air filter for use with an internal combustion engine is provided with a shield for protecting the filter element, and a ramp for deflecting dirty air onto the inner surface and along the axis of the casing, to improve efficiency of operation.

3 Claims, 10 Drawing Figures

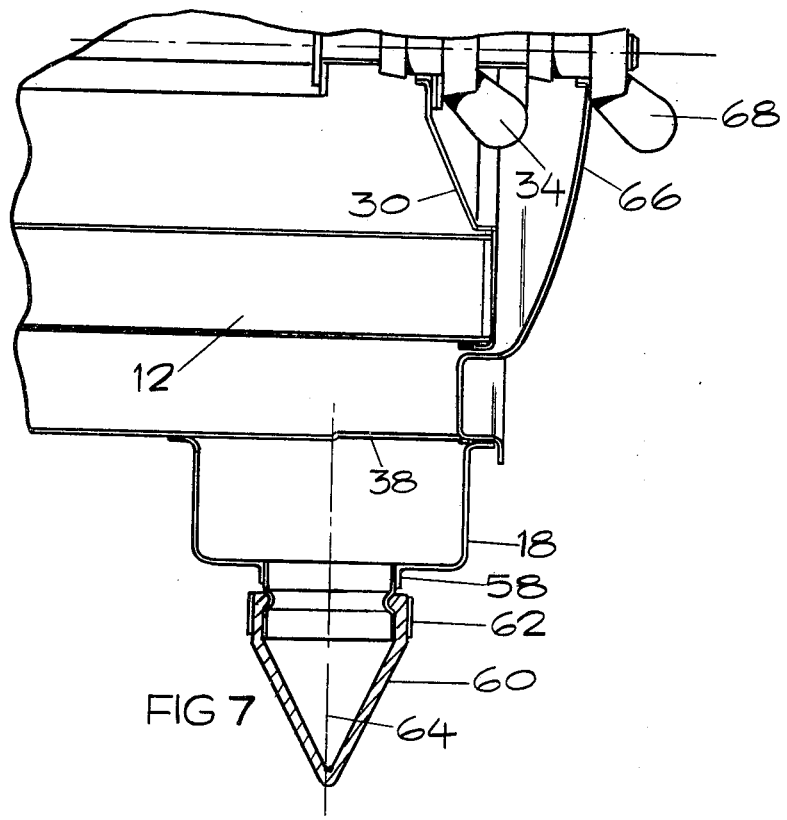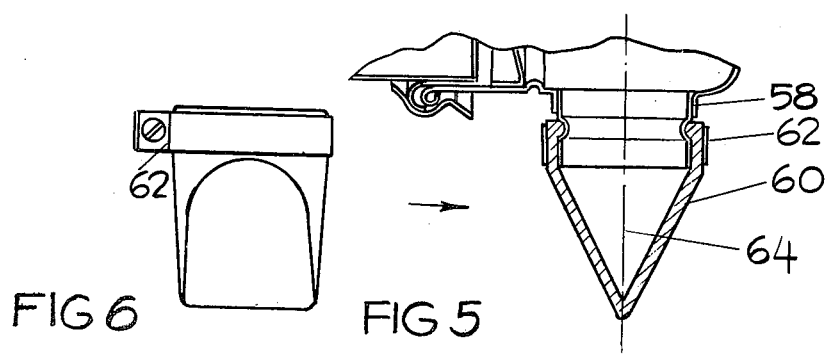

DRY-TYPE AIR FILTERS

This is a continuation of application Ser. No. 334,130, filed Feb. 20, 1973, now abandoned.

The invention relates to dry-type air filters, suitable for cleaning air as it is drawn into an internal combustion engine, but applicable to other gases and uses.

The invention provides a dry-type air filter comprising a cylindrical casing, means for mounting a cylindrical filter element inside the casing, a dirty air inlet tube having a generator tangential to the casing, a shield for protecting the filter element from direct impact by dirty air from the inlet, a ramp for deflecting dirty air onto the inner surface and along the axis of the casing, a dust collector, and a clean air outlet leading from the inside of a filter element mounted in the casing. The shield and ramp may conveniently be formed as parts of a single component.

Preferably the air inlet tube is adjacent one end of the casing and the dust collector is at or adjacent the other end of the casing. The dust collector may comprise a cup attached to the end of the casing. If so, the cup preferably has a flange pressed into its mouth and a slot in the flange to admit dust. Both the strength of the flange and the ejection of the dust are improved if the outer part of the flange is shaped as part of a shallow cone. Alternatively, the dust collector may comprise a cup secured upon the curved surface of the casing. A dust unloader may be attached to the cup in either case.

The dust collector cup attached to the end of the casing preferably has a lip receivable in a collar of U-shaped section secured around the casing, and is made fast by means of a clamp band. A permanent seal may be provided by moulding into the collar a sealing material. This is a great advantage for filters which are to be externally mounted (as on many commercial vehicles) where they are subject to rain and wheel spray.

The invention is illustrated by way of example in the drawings of which:

FIG. 2a is a perspective view of the shield in FIG. 2;

FIG. 5 shows in section a modification: a dust unloader secured to the dust cup in FIG. 1;

FIG. 6 is an elevation of the dust unloader of FIG. 5; and

FIG. 7 shows in section another modification of the dust collector end of the filter of FIG. 1.

Figure 1:
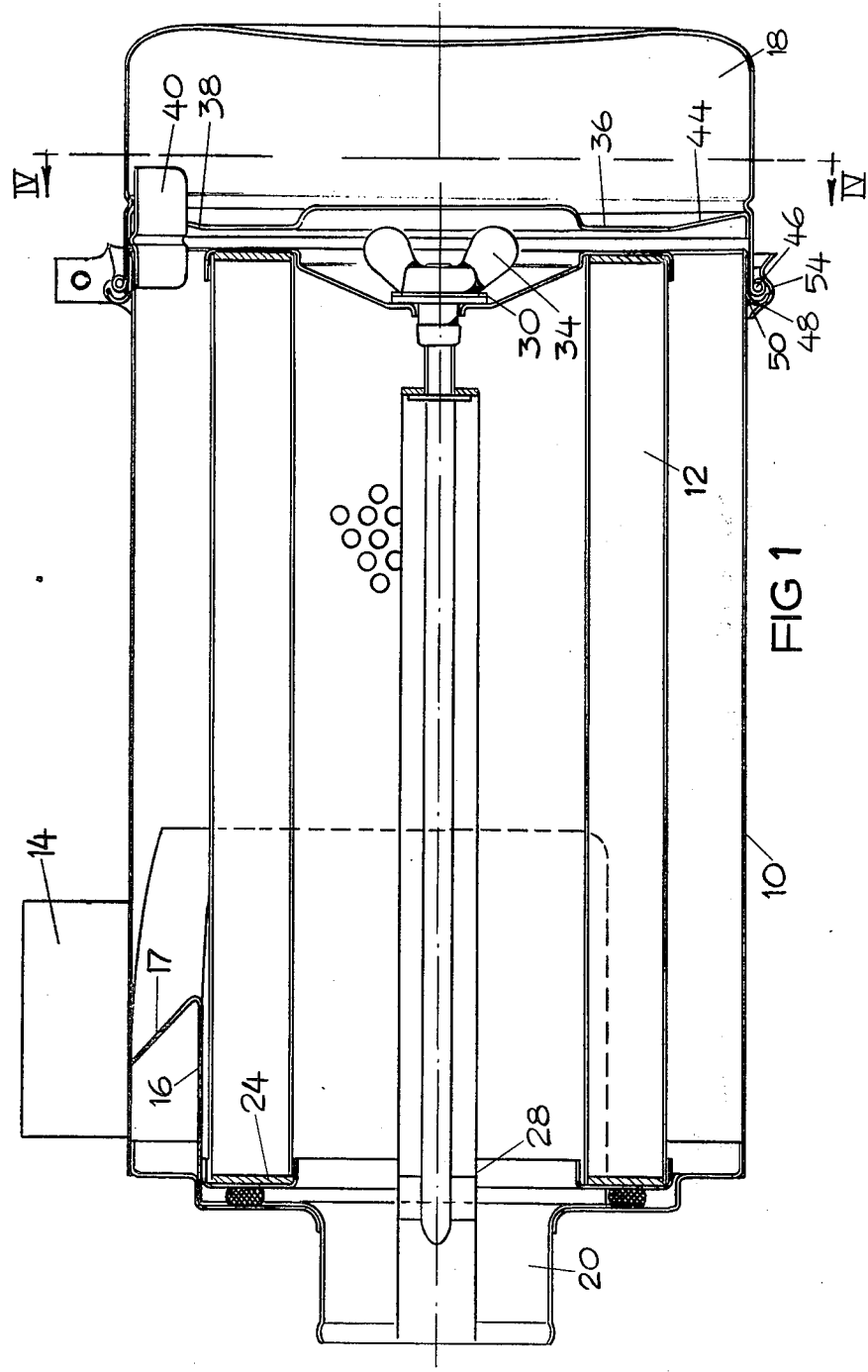
FIG. 1 is a section through a filter according to the invention with a filter element mounted in operative position.
Figure 2:
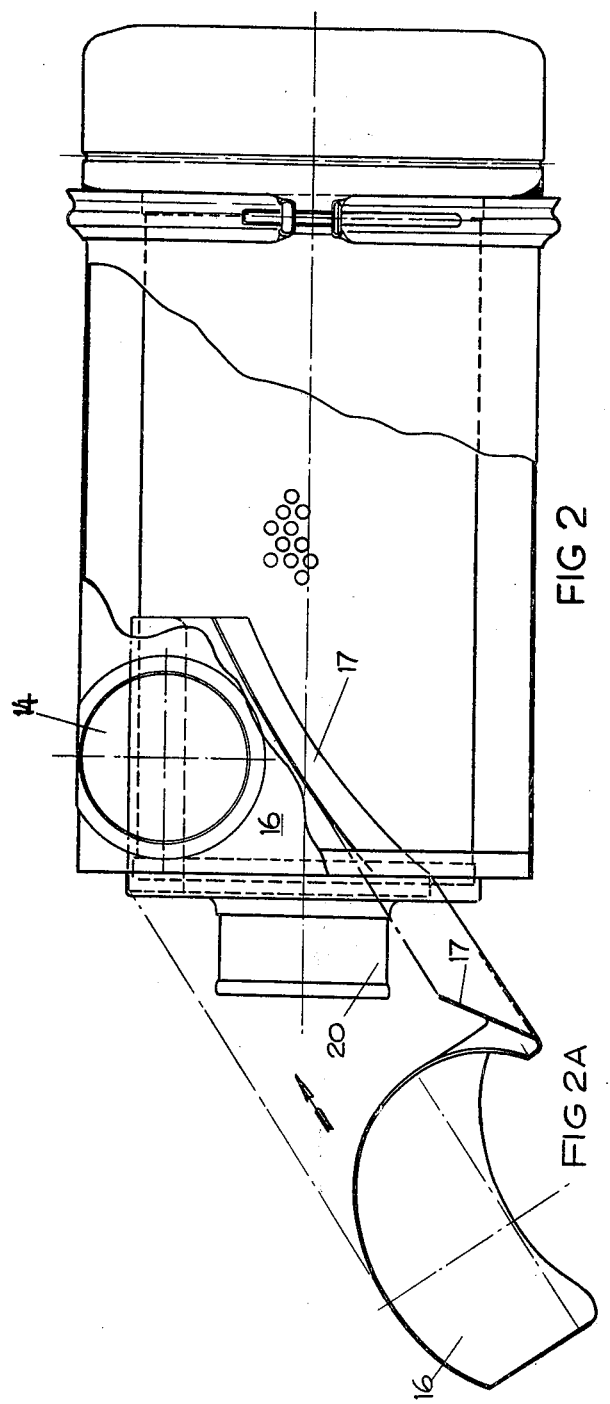
FIG. 2 is a plan of the filter of FIG. 1, part cut away to show the air-deflector shield.
Figure 3:
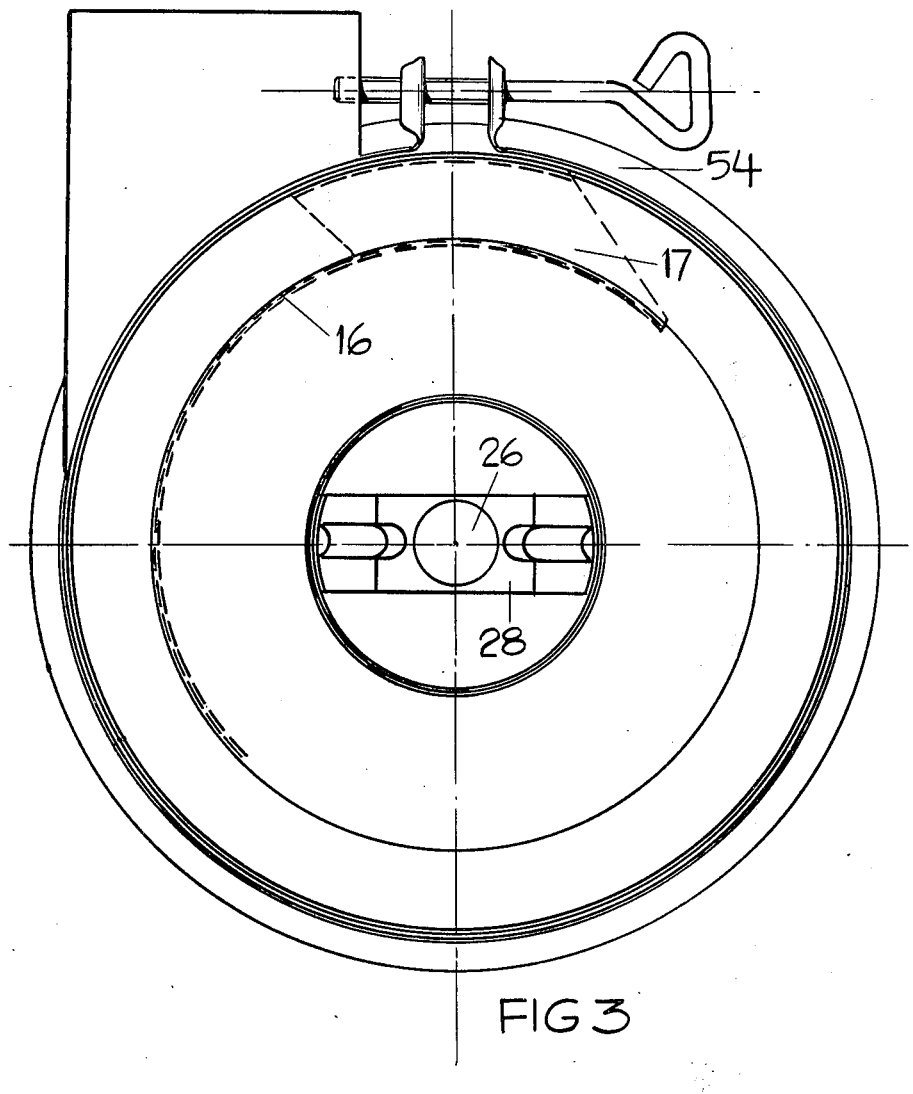
FIG. 3 is an elevation of the filter perpendicular to that of FIG. 1.
Figure 4:
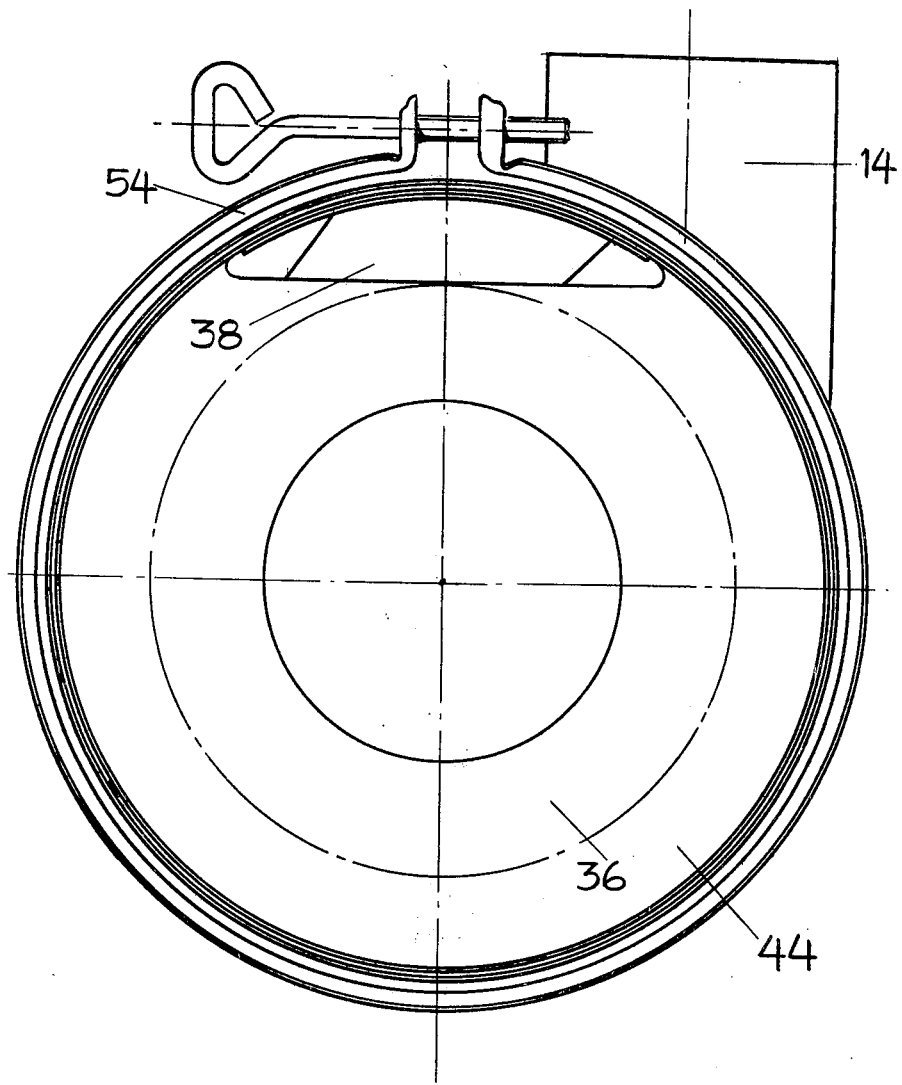
FIG. 4 is a section on IV—IV of FIG. 1.

With particular reference to FIGS. 1 and 2, the filter comprises a cylindrical casing 10, a cylindrical filter element 12 mounted therein, a dirty air inlet tube 14, an air-deflector shield 16 made as a one-piece pressing with a ramp 17, a dust collector cup 18, and a clean air outlet 20. A central bolt 26 is fast on an arm 28 secured across the outlet 20. On the right hand end of the bolt 26 a disc 30 is fastened by means of a wing nut 34 to mount the filter element 12.

Figure 8:
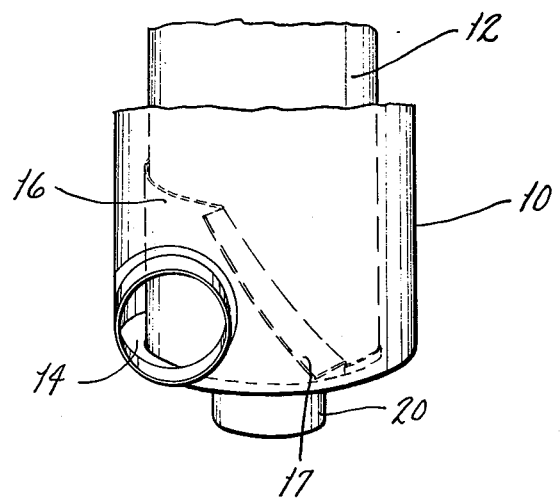
FIG. 8 is a partial top plan view of the inlet and of the air filter turned to an angle of 90° with respect to FIG. 1.
Figure 9:
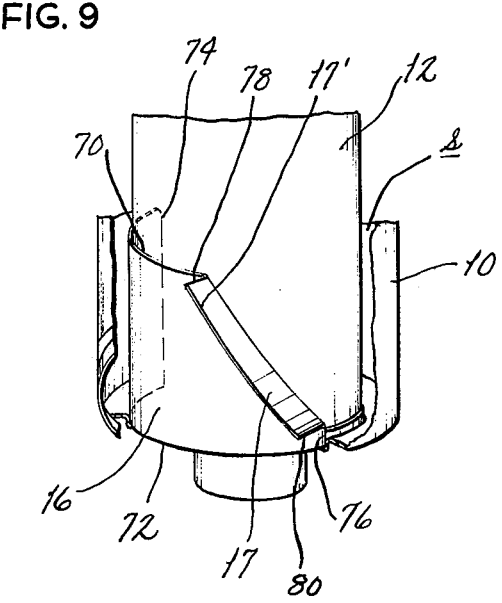
FIG. 9 is a partial top plan view of the inlet turned to an angle of 90° with respect to FIG. 1 and with a portion of the casing broken away to reveal the shield.

The dirty air inlet tube 14 has a generator tangential to the casing 10 as appears at the top of FIG. 2. The air-deflector shield 16 is shaped so as to protect the filter element 12 from direct impact by dirty air. As is evident from FIGS. 8 and 9, shield 16 is transversely arcuate in cross section and thus being of reduced peripheral extent with relation to said filter element 12 for extension about a limited portion thereof; said shield 16 being of adequate extent to prevent dirty air entering inlet 14 from impinging directly upon said filter element 12. Shield 16 is provided with a forward end edge 70, a rearward end edge 72, and side edges 74,76. Forward edge 70 terminates forwardly of inlet 14, while rearward edge 72 is disposed at the rearward end of casing 10. It will thus be seen that shield 16 is located within the spacing, as indicated at $s$, between filter element 12 and casing 10. Side edge 76 of shield 16 is bent or otherwise formed to provide an out-turned ramp 17 which is longitudinally inclined to the cylindrical curved surface of casing 10 and with its shield-remote edge, as at 17', establishing a line of contact with the inner face of casing 10. It will thus be seen that the major axis of said ramp 17 is at an angle of less than 180° to the longitudinal axis of said casing and with its forward end, as at 78, located slightly forwardly of inlet 14 and its rearward or opposite edge 80 being located laterally of said inlet 14. The ramp 17 is shaped so as to direct the dirty air towards the inner surface of the casing 10 and along its axis in a helical flow.

The dust collector cup 18 has a flange 36 pressed into its mouth, and a slot 38 in the flange 36 to admit dust. Fixed in the end of the casing 10 is a locator 40 for the slot 38. The outer part of the flange 36 is shallow-cone shaped. This helps to prevent dust being drawn onto the filter element 12 by letting its residual centrifugal force drive it up the slope into the slot 38.

The dust collector cup 18 has a lip 46 receivable in a collar 48 of U-shaped section which is spot-welded to the outside of the casing 10 and sealed thereto by a fillet 50 of heat-cured adhesive. In the U of the collar is permanently bonded an oven-cured PVC compound which seals the lip 46 of the cup in the collar. The dust collector cup 18 is fastened in position by a clamp band 54 around the collar 48 and lip 46.

In the modification of FIGS. 5 and 6 there is a hole punched in the lower wall of the dust collector cup 18, and a tube 58 fitted. A rubber dust unloader 60 is fastened to the tube 58 by a clip 62. The dust unloader has a slot 64 in its lower edge through which dust escapes.

In the modification of FIG. 7, the dust cup 18 is on the curved surface of the casing 10, and the dust unloader 60 is fitted in the same way as in FIGS. 5 and 6. The end of the casing 10 is closed off with a removable plate 66 secured by a wing nut 68.

What I claim is:

1. A dry-type air filter comprising means defining a cylindrical casing having a side wall, a cylindrical filter element, means mounting said filter element within said casing and being of relatively less diameter than said casing defining therewith an annular spacing therebetween, means defining the rearward end of said casing, means defining the forward end of said casing, said casing having a tangential dirty air inlet in its side wall proximate its rearward end, said casing also having a clean air outlet, the improvement comprising a shield disposed interiorly of said casing within said spacing, between said filter element and said dirty air inlet protecting said filter element from direct impact by dirty air from said inlet, said shield being arcuate in cross section and of reduced peripheral extent with relation to said filter element extending about only a portion thereof, said shield having a forward end edge, a rearward end edge, and first and second side edges, said forward end edge terminating a limited distance forwardly of said opening, said rearward end edge terminating proximate said casing rearward end, said first side edge being relatively remote from said inlet, said shield second side edge being relatively proximate said inlet, an out-turned ramp integrally formed on the proximate second side edge of said shield and extending across said spacing, otherwise said shield throughout its extent is spaced from said casing side wall.

2. The improvement as defined in claim 1 and further characterized by said ramp having a forward end edge, a rearward end edge, and an outer side edge, said outer side edge contacting said casing wall throughout the length of said ramp outer side edge, said ramp having its longitudinal axis at an angle of less than 180° to the longitudinal axis of said casing, with its forward end edge located slightly forwardly of said inlet and its rearward end edge presented laterally of said inlet for deflecting dirty air impinging upon said ramp toward the inner surface of the casing for flow about the axis thereof in a helical path.

3. A dry-type air filter comprising means defining a cylindrical casing having a side wall, a cylindrical filter element, means mounting said filter element within said casing and being of relatively less diameter than said casing defining therewith an annular spacing therebetween, means defining the rearward end of said casing, means defining the forward end of said casing having a tangential dirty air inlet in its side wall proximate its rearward end, a shield disposed interiorly of said casing within said spacing, between said filter element and said dirty air inlet protecting said filter element from direct impact by dirty air from said inlet, said shield being arcuate in cross section and of reduced peripheral extent with relation to said filter element extending about only a portion thereof, said shield having a forward end edge, a rearward end edge, and first and second side edges, said forward end edge terminating a limited distance forwardly of said opening, said rearward end edge terminating proximate said casing rearward end, said first side edge being relatively remote from said inlet, said shield second side edge being relatively proximate said inlet, an out-turned ramp integrally formed on the proximate second side edge of said shield and extending across said spacing, otherwise said shield throughout its extent is spaced from said casing side wall, said ramp having a forward end edge, a rearward end edge, and an outer side edge, said outer side edge contacting said casing side wall throughout the length of said ramp outer side edge, said ramp having its longitudinal axis at an angle of less than 180° to the longitudinal axis of said casing, with its forward end edge located slightly forwardly of said inlet and its rearward end edge presented laterally of said inlet for deflecting dirty air impinging upon said ramp toward the inner surface of the casing for flow about the axis thereof in a helical path, dust collecting means provided at the forward end of said casing for receiving dirty air deflected by said ramp, said casing having a clean air outlet at its rearward end, said clean air outlet communicating with the interior of the filter element rearwardly of said shield.

* * * * *